(12) United States Patent
Harkness

(10) Patent No.: US 6,227,862 B1
(45) Date of Patent: May 8, 2001

(54) DRIVER TRAINING SYSTEM

(75) Inventor: Richard Harkness, Elk Grove, CA (US)

(73) Assignee: Advanced Drivers Education Products and Training, Inc., Sacramento, CA (US)

( * ) Notice: Subject to any disclaimer, the term of this patent is extended or adjusted under 35 U.S.C. 154(b) by 0 days.

(21) Appl. No.: 09/249,513

(22) Filed: Feb. 12, 1999

(51) Int. Cl.[7] .............................. G09B 9/04; G09B 19/16
(52) U.S. Cl. ............................ 434/65; 434/64; 434/238; 434/258
(58) Field of Search ........................ 434/29, 61, 62, 434/64, 66, 65, 69, 71, 236, 307 R, 238, 258, 365, 308, 237, 250, 118, 305; 701/35, 205; 280/767, 81.6; 340/988; 273/249

(56) References Cited

U.S. PATENT DOCUMENTS

| | | | |
|---|---|---|---|
| 3,777,413 | * 12/1973 | Zaccheo | 434/237 |
| 3,916,534 | * 11/1975 | Riccio | 434/64 |
| 4,486,180 | * 12/1984 | Riley | 434/65 |
| 4,500,868 | * 2/1985 | Tokitsu et al. | 340/439 |
| 4,750,888 | 6/1988 | Allard et al. . | |
| 4,814,896 | * 3/1989 | Heitzman et al. | 386/95 |
| 4,846,686 | 7/1989 | Adams . | |
| 4,868,771 | 9/1989 | Quick et al. . | |
| 4,939,587 | 7/1990 | Deslypper . | |
| 4,952,152 | 8/1990 | Briggs et al. . | |
| 5,131,848 | * 7/1992 | Adams | 434/69 |
| 5,184,956 | 2/1993 | Langlais et al. . | |
| 5,187,571 | 2/1993 | Braun et al. . | |
| 5,209,662 | 5/1993 | Fujita et al. . | |
| 5,253,107 | 10/1993 | Smith . | |
| 5,275,565 | 1/1994 | Moncrief . | |
| 5,344,324 | * 9/1994 | O'Donnell et al. | 434/258 |
| 5,350,179 | * 9/1994 | Hill et al. | 273/249 |
| 5,366,376 | * 11/1994 | Copperman et al. | 434/69 |
| 5,474,453 | * 12/1995 | Copperman | 434/29 |
| 5,486,112 | * 1/1996 | Troudet et al. | 434/250 |
| 5,499,182 | * 3/1996 | Ousborne | 701/35 |
| 5,613,032 | 3/1997 | Cruz et al. . | |
| 5,652,717 | 7/1997 | Miller et al. . | |
| 5,660,547 | * 8/1997 | Copperman | 434/29 |
| 5,807,114 | * 9/1998 | Hodges et al. | 434/236 |
| 5,813,863 | * 9/1998 | Sloane et al. | 434/236 |
| 5,828,943 | * 10/1998 | Brown | 434/258 |
| 5,888,074 | * 3/1999 | Staplin et al. | 434/258 |
| 5,954,510 | * 9/1999 | Merrill et al. | 434/236 |

\* cited by examiner

*Primary Examiner*—Joe H. Cheng
(74) *Attorney, Agent, or Firm*—Blakely Sokoloff Taylor & Zafman

(57) ABSTRACT

A system and method for providing driver training and education particularly targeted towards teenage drivers. A system and method focus on six major areas that address both driving and lifestyle skills. The six major areas are i) lifestyle, ii) risk and benefit perception, iii) visual search, iv) speed adjustment, v) space management and vi) hazard recognition. The invention is directed to post licensing training and education. Content is embedded in a multi-faceted instructional framework using contemporary learning methods that work with teens using multi-media technologies and integrated and realistic subject matter utilizing three main components, namely workout sessions, computer based training (CBT) and parent-teen activity. The invented system and method encourages and enlists participation of the parents who are recognized as key agents in the development of safe driving practices. There is an ongoing assessment, which provides feedback for remediation. Further, certification provides additional incentive for learning.

7 Claims, 4 Drawing Sheets

Driving "Bull's-eye"

DRIVER TRAINING SYSTEM

BACKGROUND OF THE INVENTION

The present invention relates to systems and methods for training automobile drivers, and particularly, teenage drivers, how to drive automobiles with particular emphasis on safety issues.

Various techniques, systems and methods are available for providing driver education and training. Such training typically involves actual, behind the wheel driving, which may or may not be supplemented with classroom instruction. Also known are driving simulators in which images are displayed on a display device. A steering wheel, brake and accelerator are connected in a feedback loop such that under computer control, the image displayed varies as a function of the student's operation of the brake pedal, accelerator and steering wheel. Additional views, such as left side views, right side views and rear views may be provided within separate windows on the display device, or using separate display devices for views in addition to views simulating a forward view.

However, notwithstanding such training and education, over the years, there has not been a significant reduction in the accident rate of teenage drivers. It is believed that prior art techniques do not result in reductions in accident rates because although traditional training programs cover numerous topics, the various topics covered by prior art training programs are typically provided in a relatively superficial manner with no particular focus.

Further, such prior art driver education is typically provided prior to licensing. For this reason, content focuses on basic skills needed to pass the DMV Drivers License test. While certain safety skills may be taught, typically, there is little or no motivation for the student to learn such safety skills. Safety skills only become relevant after licensing and some driving experience.

SUMMARY OF THE INVENTION

A system and method are disclosed for providing driver training and education, particularly targeted towards teenage drivers, but relevant to older, more experienced drivers as well. A system and method focus on six major areas that address both driving and lifestyle skills. The six major areas are i) lifestyle, ii) risk and benefit perception, iii) visual search, iv) speed adjustment, v) space management and vi) hazard recognition.

The present invention is directed to post licensing training and education. Content is embedded in a multi-faceted instructional framework using contemporary learning methods that work with teens using multi-media technologies and integrated and realistic subject matter rather than traditional textbook, linear approaches typical of the prior art.

Multimedia driving scenarios employ the technology of four independent cameras creating a realistic driving environment with three separate mirrors and the front windshield view. This allows for discrete user selections in each area, which is recorded and analyzed for diagnostic and remedial prescription.

The invented system and method encourages and enlists participation of the parents who are recognized as key agents in the development of safe driving practices. There is an ongoing assessment that provides feedback for remediation. Further, certification provides additional incentive for learning.

The invented method and system utilizes four main components, namely workout sessions, computer based training (CBT), parent-teen activities and a certification test.

DETAILED DESCRIPTION OF THE INVENTION

The present invention is a system and method for training teenage automobile drivers.

Figure 1A:
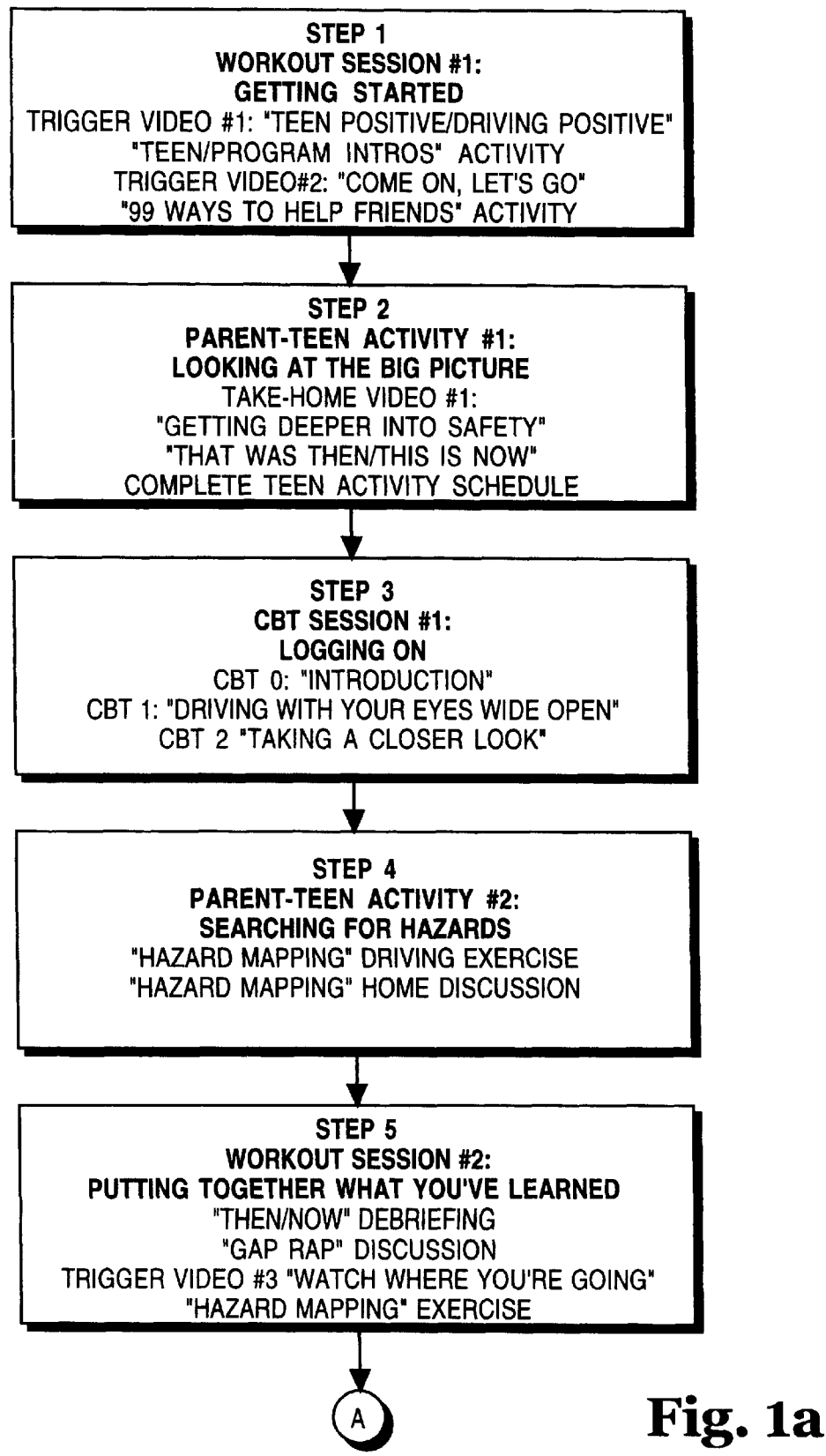
FIGS. 1a–1c form a flow diagram showing the steps forming the present invention.

Referring to FIG. 1a and Table I below, the first two steps used to begin the training are illustrated and outlined. These first two steps include a workout session and parent-teen activity with a brief explanation of the purpose and elements of these steps shown in the Table. Further details are provided in the description below at the referenced sections.

TABLE I

| Figure 1a: Component: | Purpose: | Element: | Section |
|---|---|---|---|
| Workout Session #1 (STEP 1) | • To begin building a community of teens/peers where safe driving is valued and reinforced and which possesses the necessary skills to emulate more experienced drivers.<br>• To introduce key facts about teen driving and re-examine mistaken views and stereotypes about teens<br>• To begin creating an understanding that how we drive is part of defining who we are as people<br>• To distribute program materials and provide a high-level overview of key program components | 1. Warm-Up: Trigger Video: "Teen Positive/Driving Positive"<br>2. Program and "Teen Introductions" exercise<br>3. "Picture This" Small Group Activity<br>4. Trigger Video: "Come On Let's Go"<br>5. Video Large Group Debrief<br>6. Small Group: "99 Ways To Help My Friends Drive Safely"<br>7. "Cool Down" Program Preview | I.A-I.D |
| Parent-Teen Activity #1 (STEP2) | • To build a sense of parental involvement around safe driving<br>• To introduce what will be taught<br>To get parents and teens talking about issues challenging teens | 1. Orientation Video: "Getting Deeper Into Safety"<br>2. "That Was Then/This is Now" Parent/Teen Interview<br>3. Schedule program components | II.A-II.E |

Figure 1B:
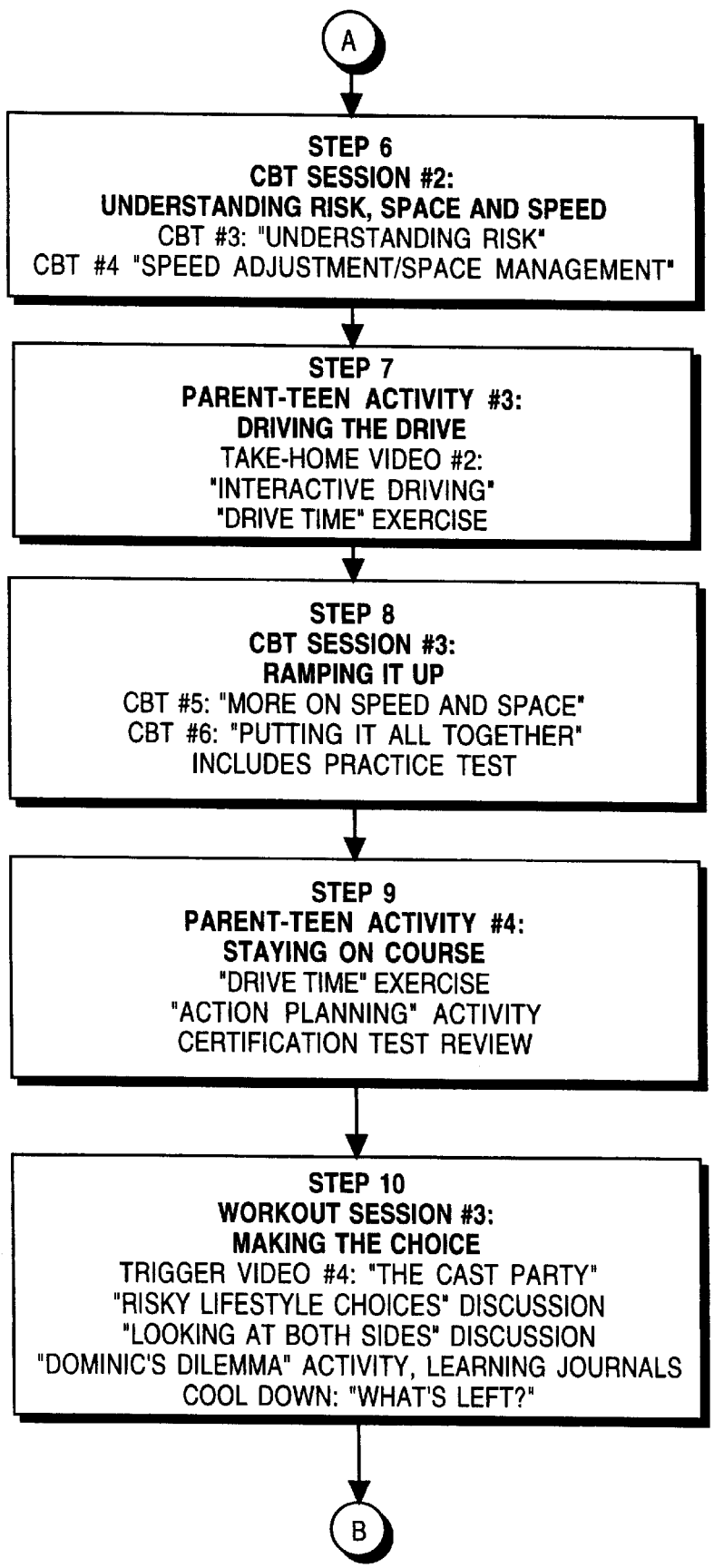
Figure 1C:
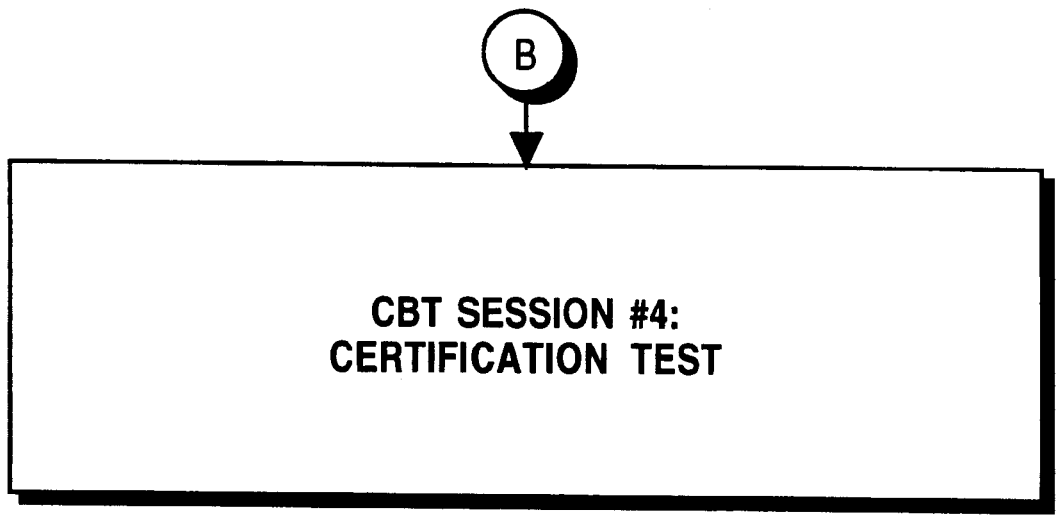

Referring to FIG. 1b and Table II below, the remaining nine steps used to complete the training are illustrated and outlined. These steps include additional workout sessions, additional parent-teen activities and computer based training (CBT) with a brief explanation of the purpose and elements of these steps shown in the Table. Further details are provided in the description below at the referenced sections.

TABLE II

| Figure 1b: Component: | Purpose: | Elements: | Section |
|---|---|---|---|
| Computer Time #1 (STEP 3) | • To make teens comfortable with the technology<br>• To build on concepts of safe driving in Orientation Video and Workout<br>1. To develop and practice understanding of Visual Search<br>• To develop a database of teen responses for diagnostic and prescriptive study/remediation. | 1. Logging on<br>2. CBT Introduction: Preview and Practice<br>3. CBT #1: "Driving With Your Eyes Wide Open"<br>4. CBT #2: "Taking A Closer Look" | III.A-III.D |
| Parent-Teen Activity #2 (STEP 4) | • To reinforce sense of parental involvement around safe driving<br>• To provide practice in identifying hazardous environments and discuss coping strategies<br>• To provide basis of discussion for ensuing Workout Session activities | 1. Hazard Mapping Driving Exercise<br>2. "Picking the Worst of the Worst" Discussion | IV.A-IV.E |
| Workout Session #2 (STEP 5) | • To continue building a community of teens/peers<br>• To provide a chance to discuss what's been learned so far<br>• To further develop visual search and hazard identification skills | 1. Warm-Up: Hazard Relay<br>2. "That Was Then/This is Now" Team Exercise<br>3 "Gap Rap" Small Group Activity<br>4. Trigger Video: "Watch Where You're Going"<br>5. Small Group Exercise: "Hazard Mapping"<br>6. Cool Down: "What's Next?" | V.A-V.D |
| Computer Time #2 (STEP 6) | • To make teens aware of and let them practice risk/benefit analysis<br>• To expose teens to and let them practice speed adjustment and space management | 1. CBT #3: "Understanding Risk"<br>2. CBT #4: "Introduction to Speed Adjustment and Space Management | VI.A-VI.D |
| Parent-Teen Activity #3 (STEP 7) | • To continue building a sense of parental involvement<br>• To introduce and model "interactive driving"<br>• To reinforce key concepts discussed thus far<br>• To provide "interactive driving" practice on key concepts | 1. Take-Home Video: "Interactive Driving"<br>2. Parent-Teen Interactive "Drive Time" Exercise | VII.A-VII.E |
| Computer Time #3 (STEP 8) | • To expose teens to techniques to use speed and space concepts<br>• To practice components of safe driving conceptual model<br>• To revisit key learning points<br>• To help prepare for certification | 1. CBT #5: "More on Speed and Space: Advanced Techniques"<br>2. CBT #6: "Putting It All Together"<br>3. Practice-Test | VIII.A-VIII.D |
| Parent-Teen Activity #4 (STEP 9) | • To continue building parental involvement around safe driving<br>• To practice "advanced" driving<br>• To create an "action plan"<br>To prepare for Certification Test. | 1. Parent-Teen Advanced Techniques "Drive Time"<br>2. Parent-Teen Action Planning<br>3. Certification Test Review | IX.A-IX.E |
| Workout Session #3 (STEP 10) | • To present the idea that "how you live is how you drive"<br>• To think about the benefits associated with mature behavior<br>• To think about what kinds of risks teens take and why<br>• To identify the kind of risky behaviors that can be correlated to risky driving<br>• To allow participants to apply these concepts to the kinds of social interactions that teen routinely face<br>• To allow teens too start thinking about how to identify possible coping strategies and to verbally defend making the "right choice"<br>• To encourage teens to focus on applying the skills and techniques they've learned. | 1. Trigger Video: "The Cast Party" Part 1<br>2. Large Group Discussion: "Risky Lifestyles Choices"<br>3. Trigger Video: "The Cast Party": Part 2<br>4. Large Group Discussion: "Looking at Both Sides"<br>5. Trigger Video: "The Cast Party": Part 3<br>6. Small Group Activity: "Dominic's Dilemma"<br>7. Review Learning Journals<br>8. Cool Down: "What's Left?" | X.A-X.D |
| Computer Time #4 CERTIFICATION | • Certification Test<br>• To test critical content/behaviors | | XI.A-XI.B |

I. Workout Session #1 (STEP 1)
  A: Time: 60 minutes
  B: Session Objectives:
    To begin building a community of teens/peers where safe driving is valued and reinforced and which possesses the necessary skills to emulate more experienced drivers
    To introduce key facts about teen driving and re-examine mistaken views and stereotypes about teens
    To begin creating an understanding that how we drive is part of defining who we are as people
    To distribute the "Program Materials" and provide a high-level overview of key program components
  C: Instructional Elements/Sequence:
    1. Warm-Up: Trigger Video: "Teen Positive/Driving Positive" (2–3 minutes)
    2. "Program and Teen Introductions" Pairing Exercise (15 minutes):
    3. "Picture This" Small Group Activity (15 minutes)
    4. Trigger Video: "Come On Let's Go" (2–3 minutes)
    5. Video Large Group Debrief: (5 minutes):
    6. Small Group Exercise: "99 Ways To Help My Friends Drive Safely" (15 minutes)
    7. Cool Down: Program Preview (5 minutes)
  D: Description:
    1. Warm-Up: Trigger Video: "Teen Positive/Driving Positive" (2–3 minutes): This introductory piece shows Anne in a library type setting, casting teens for her film. The video shows positive images of teens driving, having fun behind the wheel in a responsible way, and doing the kind of "mature things" (running errands, getting to work/school) that are associated with driving, both alone and with their friends. Featuring upbeat music and extensive B-roll footage, the piece clearly illustrates the lifestyle of teens as they drive and the benefits associated with driving. It primarily features cast member reactions to sample questions such as: "Why do you like to drive? What do you need to be a better driver? How has driving changed your life for the better? What kind of person are you and how is that reflected in your driving?" In doing so, it delivers the message that this is a fun, friendly program that is also challenging and beneficial. In short, this is a program that respects teens, wants to help them, and will give them the necessary skills to get what they want.

The teens receive copies of their Workbooks. The facilitator stresses that this is a "workout," not a class; so they will be "on their feet" and highly involved, with little or no lecture.

2. "Program and Teen Introductions" Pairing Exercise (15 minutes) The teens are then put into pairs and asked to interview/introduce each other based on the following types of questions in their Workbooks:
      How long have you been driving?
      What are the top three things you use the car for?
      Complete this sentence: If I could do one thing to be a better, more skillful or safer driver, it would be.
    After completing the interview, teens then "introduce" their partners to the group as a whole by reading their responses to these questions.
    Very briefly, the facilitator introduces the program by making the following points:
      Why we're here: to help you be better. safer and more skillful drivers
      The scientific basis for the program
      "What's in it for you as a teen"; e.g., lower insurance rates, a greater feeling of confidence and skill, and potentially enhanced driving privileges
      What the program is: lots of ways to help you; CBT, workshops with other teens, and Parent-Teen Activities
      Details are provided at end of workshop
    3. "Picture This Activity" (15 minutes): The teens are put into two teams, given flip chart pages and pens, and asked to draw an image of the typical teen driver as he/she is perceived by the outside world. They are given 5 minutes to do this. Then each small group presents its picture to the group as a whole and some key conclusions are drawn and synthesized. This is a chance for the teens to "ventilate" and get some of their feelings on the table and have them acknowledged as being valuable. A skilled facilitator, however, is required to ensure that this doesn't degenerate into a "moan and groan" session. There is a discussion of whether these ideas, preconceptions, and stereotypes are true or untrue. which then leads into a discussion of the corresponding "Teen Facts". For example, "Here's a stereotype/idea. Who thinks this is true? Untrue?"
      Stereotype: Teens are more likely to drink and drive than adults.
      Teen Fact: NO! In general, teens are far less likely to drive drunk than adults.
      Stereotype: When teens are involved in a serious collision, it is usually their fault.
      Teen Fact: YES! 37 out of 100 new drivers get into a crash the first year due to driver error and speeding.
    In cases where the teens are not forthcoming with good examples, the facilitator should be able to draw from some prepared points in his/her Facilitator Guide.
    Trigger Video "Come One Let's Go" (2–3 minutes): In this video, we set up a typical teen driving scenario as a basis for leading into the follow-up debriefing and then the exercise: "99 Ways I Can Help My Friends Drive Safely". In the last video, Anne was casting teens for her driving film. Anne has now selected her teen cast and is ready to roll the cameras. In this video we see Alan picking up Dominic, Heather and Emma. Each one is urging him to hurry up as not to be late.
    In general, we see the driver is conflicted because he's the kind of person who wants "to keep everybody happy". So he tries to drive fast, but not too fast, tries to be safe but not look like a wimp. As a result, he runs the risk of pleasing no one.
    In general the girl in front remains quiet, but plays with the radio, distracting the driver.
    During the drive, the girl in back applies her lipstick using the rear view mirror.
    The girl in the back seat gives directions at the last minute, driver turns sharply and cuts corners.
    In his rush, the passenger forgets to put on a seat belt and the driver reminds him to do so before they pull into traffic.
      Although he maintains a reasonable rate of speed overall, the driver cuts in and out of traffic, often without signaling. From time to time, he gets the positive feedback from the other boy like, "Hey I didn't know you had it in you!" Especially when the driver pulls off something that is borderline dangerous.
      When the driver wisely stops at a changing yellow/red light, the other boy says, "You could've made that!"
    5. Video Debrief: (5 minutes): There is a quick debriefing of the video. The purpose here is to stress the value of safe driving and how peers must provide support for safe driving behaviors. In this brief discussion, the group discusses:
      What kinds of safe/unsafe driving behaviors did you see?
      What did the driver do here correctly? What skills did you see? How did the driver try to drive safely?

How would you feel if you were the driver? What kind of pressures would you respond to? Which would you ignore? How might you defend your decisions verbally?

In what ways did the friends contribute to safe/unsafe driving behaviors? What did that say about them as people?

In what other non-driving related ways, could the teens have handled this situation to lessen the tension?

6. Small Group Exercise: "99 Ways To Help My Friends Drive Safely" (15 minutes): The overall purpose of this exercise is to build the sense that teens are part of a larger community/peer group that can actively support better/safer driving behaviors on an ongoing basis.

To begin the exercise, the teens are split into two teams. Each team is given flip chart sheets and markers and told to identify, "99 Ways" to help their friends drive safely. They are told that the number "99" just means you can always think of more ideas as long as you keep the creative juices flowing. The workout leader also gives them a few examples to "prime the pump". The teams are given 5 minutes to come up with as many ideas as possible. After 5 minutes, each group makes a presentation of its ideas. The teens are encouraged to record these (and other ideas they connect with) in their workbooks and to try and implement them when they are with their friends and peers.

7. Cool Down: Program Preview (5 minutes): The facilitator tells the teens they can "cool down" as the workout is almost over. He/she states, "From this last exercise, you can see there are lots of ways to be safe on the road. That's what this program is about . . . giving you the tools you need to be safe—as well as being more skillful. Two things which naturally go hand in hand." He/she gives a very brief description of the program "components" as follows:

Overall program goal; e.g., the "16–18 year-old" change in experience.
Workout Sessions
CBT components
Take-home media; including, the video which contains the Orientation video.
Parent-Teen Activities
Certification Testing
As a part of this, the teens receive a copy of the Take-Home Video and the teens are given directions for the first "Parent-Teen Activity".

Figure 2:
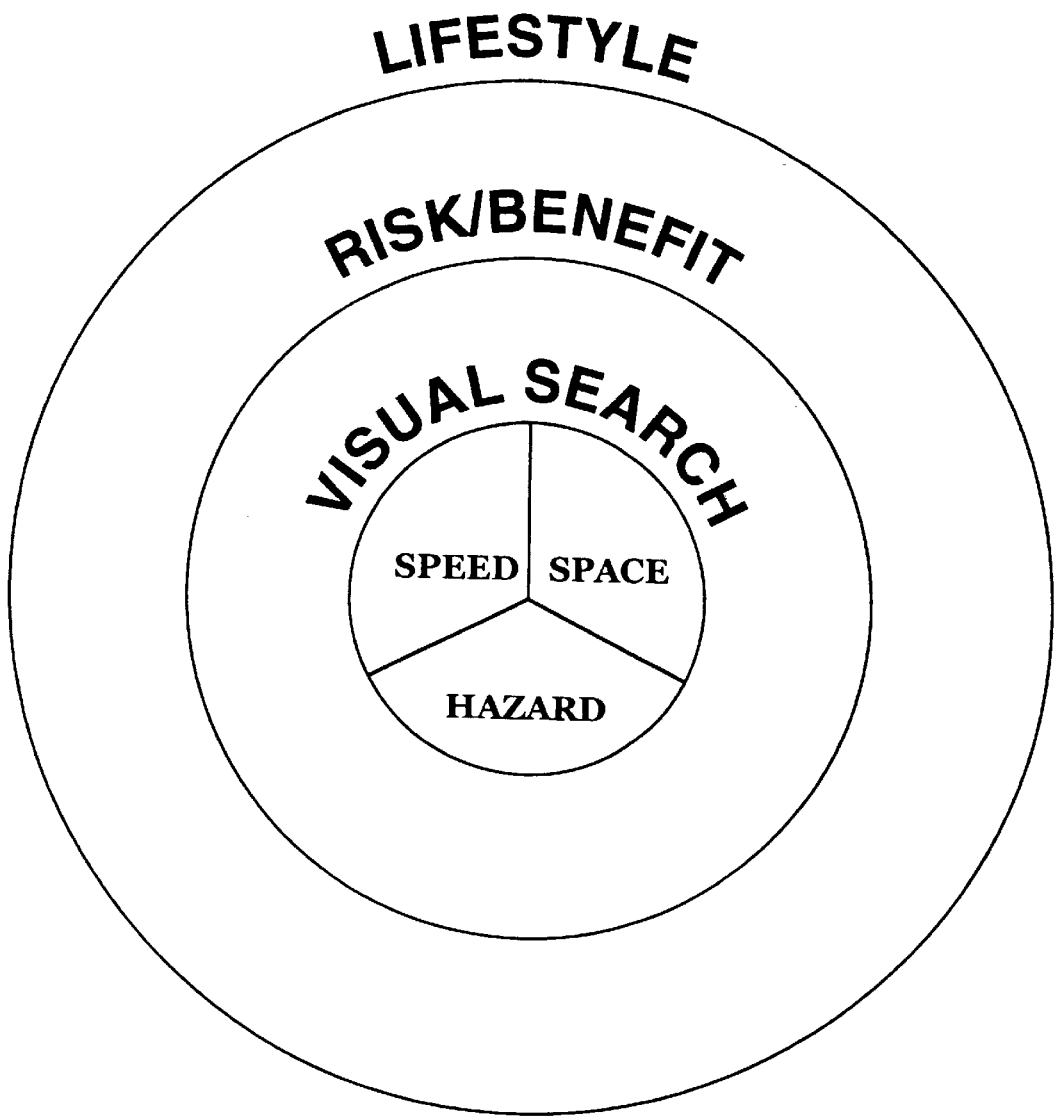
FIG. 2 is a diagram showing the major areas of attention addressed by the present invention.

II. Parent-Teen Activity #1 (STEP 2)
A Time: 45–50 minutes
B: Place: Home
C: Activity Objectives:
  To build a sense of parental involvement/partnership around safe and skillful driving and the teen's participation in the program
  To introduce parents to (and reinforce with teens) what will be taught and how
  To get parents and teens talking about safe driving and the issues challenging teens today
D: Instructional Elements/Sequence:
  1. Orientation Video: "Getting Deeper Into Safety" (20 minutes)
  2. "That Was Then/This is Now" Parent-Teen Interview (15–20 minutes); including guidelines provided for parent in "Parent Guide"
  3. Scheduling program activities
E: Description:
  1. Orientation Video: "Getting Deeper Into Safety" (20 minutes). The parents and teens are directed to watch this video together to get a sense of what's involved in the video and the program.
  (a) Purpose
  The overall purpose of the video is:
    Introduce the "film within a film" metaphor that runs throughout the course of the CBTs
    Introduce the conceptual world view from the Driving Bull's Eye in FIG. 2 (6 factors) about what constitutes the basis for safe and skillful driving behaviors
    Provide an overview of the program logistics that reinforce what was taught in the first Workout
  (b) Introduction of the Film Within A Film Metaphor
  In terms of overall treatment and approach, the video introduces the characters, and helps viewers understand who the characters are. The video contains these key elements:
  How Claude and Claudia came to be the narrators.
  Clyde and Claudia explain the goals of the program and provide an overview of all components.
    The beginning of the "actors' journey" by showing a number of teen actors arriving at the "studio" for a "teen safe/teen skilled driving film". The atmosphere is teen-positive, with upbeat music, and stresses the pleasure of driving and of being young. Quick "snapshot" introductions to our four main characters include:
      Dominic—a bit of a "jock", someone who prides himself as being a good driver who can handle difficult situations, but has mistaken notions about the risks/benefits of his behaviors.
      Alan—a bit of a class nerd, funny, tends to live in his head, can see the pluses and minuses of a given situation clearly, and has a tendency to bump into things.
      Emma—a person who is very good at taking on responsibility, but not quite as good in terms of speaking up for herself; overly cautious and shy.
      Heather—a "Deadhead", is very good at seeing the whole picture, but challenged in terms of specific driving skills.
    In the opening scene. we also meet the "creative team" behind making the video. They are:
      Anne—the writer/producer of the show; very teen positive, wanting very much to involve teens in the process of creating a useful film, not sure of all the answers, committed to the Socratic approach and interested in the more non-driving lifestyle elements involved in safe and skillful driving.
      Jack—the director; very much likes working with young people; has a background in shooting car crash and chase films. He is very aware of the "science" of driving, not so much interested in what he considers some of the more "touchy-feely" elements, but willing to listen with an open mind.
      Clyde and Claudia—the Narrators; very positive and upbeat, eager to help Anne and Jack create a safe driver film. Clyde and Claudia explain interactive driving and provide an overview through snapshots of the different program components including:
        The Teen Workout Sessions
        The Parent-Teen Activities
        The CBT Sessions
        The Certification Test (c) Conceptual World View In the course of this video, Anne uses the Socratic method to begin building a general understanding of the basis of safe and skillful driving behaviors. This is done as follows:

Anne asks a series of critical questions of the various actors to help reveal their attitudes about driving and expose typical teen viewpoints that adds to the power of the film. It is on the basis of their responses that the film will be produced. These kinds of "probing questions" also reflect the analysis that we want the teens watching the movie to do with their parents. The questions are:

How do you want to see yourself as a person? And as a driver?

How do you want the following people to see you as a person and driver: Peers? Parents? Other Drivers?

On a scale of 1–10, how would you evaluate your own driving skills? (Seeing things around you in general? Spotting hazards/troubles before they happen? Adjusting your speed to the flow of traffic? Maintaining a safe distance?)

Once the cast is in place, the actual filming begins. When the cast arrives for the first day they are surprised to see that there is no "script" as such. Anne explains the reason for this; e.g., she wants to try the approach of testing various theories and ideas and running them by the cast to see how well they connect and respond. She expects they will discuss, even debate some of the topics.

The process begins with the crash rate chart that describes and contrasts the accident rate between 16- and 18-year-old drivers. The key question is "What is it that more experienced drivers do that keeps them on the road and out of trouble?" The obvious answer is, "They're more experienced", but can that "experience" be speeded up to help younger teens now?

Based on this key question, the following points start to emerge:

Good driving begins with the eyes. Nobody can drive blindfolded!

Okay, so the eyes are key here. But what are you looking for? First off, there are things that you can control: e.g., your speed and the space between your car and other vehicles.

So what else are you also looking for? Next, there are things that you can't control but have to identify as they occur; e.g., hazards and risky situations.

At this point, the cast agree that they've identified some key driving behaviors. However, is that the whole picture? What else is there that expands and completes this view? These items are:

What you want from driving also influences how you drive: e.g., the benefits you're looking for and the risks you're willing to run to achieve them . . . .

Which leads to how you live your life and the kind of person you are, especially the sense you have of living a larger "social contract" with all the people around you, beginning with your peers and family. This includes the idea of your willingness to stand up for these beliefs and verbally defend them even in the face of peer pressure.

In conclusion, Anne stresses how this is a "comprehensive and thorough" model; e.g., it works as a system and the good driver is aware of all of these elements simultaneously and almost unconsciously.

That's what we're talking about when we talk about "experience;" with repeated application, all of these elements become part of the way we live and drive, they become "second nature," as it were. (For the purpose of teaching and learning, however, the cast takes each of these elements one at a time and looks at how they work and how they fit in to an overall larger model.)

As this discussion winds down to a finish, Anne tells the group that they'll begin with "using their eyes." Domninic interrupts and asks about how the program is going to work as a whole, and Anne explains her concept.

The video cuts to Clyde and Claudia on Jack's set. They discuss the commitment required from both the teen and the parent. The Student Workbook and Parent Guide are introduced. The parents are instructed to complete the "That Was Then, This Is Now" activity and to sign the parent sign off form. Teens are then instructed to return the form at the next workout. Clyde and Claudia thank the viewers for their attention and commitment to safety and wave goodbye.

2. "That Was Then/This is Now" interview (15–20 minutes)

After viewing the video, and having been exposed to the fundamental issues, skills, and attitudes surrounding safe and skillful driving behaviors, the parents and teens start actually applying this material to their own lives. In this way, "talking together" prefigures the actual parent-teen "Drive Time" practice sessions that will follow in the program. This discussion involves an "interview" where the teen poses the following questions to his/her parents, records their answers in the Workbook, and brings them to the next "Workout Session" for a debrief. (See Workout Session #2.) The parent is provided with guidelines in the "Parent Guide" for how to answer these questions; e.g., "Don't just answer in 'Yes'/'No' format, but provide detailed explanations and examples." The questions here are:

When did you first start driving/get your license? What was the first car you ever drove? How did you get it? What kind of driving? did you typically do? How much?

How did driving back then compare to driving today? What was safer? What was more dangerous? About cars? Traffic? People?

Think about your driving ability when you first got behind the wheel. After 2–3 years of driving, what were you doing that made you a better, safer, more skillful driver? What did you change? How did these changes come about?

3. Scheduling program activities (5–10 minutes)

Parents and teens are encouraged to discuss and set up a schedule to ensure all program components are completed within the prescribed time frame. The teen completes a Learning Journal Entry.

III. Computer Time #1 (STEP 3)

A: Time: 60 minutes

B: Session Objectives:

To make teens comfortable interacting with the computer technology and provide them with an opportunity to navigate and practice To build on concepts of safe and skillful driving introduced in the Orientation Video and Workout To develop the teen's understanding of Visual Search techniques as the cornerstone of safe and skillful driving To allow the teen to apply and practice Visual Search techniques in a variety of situations To develop a database of teen responses for diagnostic and prescriptive study and remediation.

C: Instructional Elements/Sequence:
1. Logging On
2. CBT #0: Introduction: Preview and Practice (15 minutes)
3. CBT #1: "Driving With Your Eyes Wide Open" (15 minutes)
4. CBT #2: "Taking A Closer Look". (30 minutes)

D: Description:
1. Logging On
   When the teen signs in and enters his/her password, he/she sees a Home Page that gives all the options. These include the following elements;
   A CBT Practice option which can be accessed when the teen signs on; however, if this is the teen's first time. it will be highlighted with an "Intro" button
   A button which shows a "Run CBT" option which accesses the next CBT in the teens progress path
   Student Status—shows which component has been completed
   The CBTs that the teen has completed are "shaded out," the next available CBT highlighted—as the teen moves through the program
2. CBT Introduction: Preview and Practice (15 minutes)

(a) Purpose
The overall purpose of this CBT is to:
   Give the teens a chance to perform a brief "self-assessment" and complete a short survey of driving behaviors
   Describe the various CBT components and basic CBT terminology
   Give the teens a chance to walk through driving scenarios
   Build enthusiasm for the CBT approach (b) Self-Assessment and Survey
Clyde and Claudia address the teen directly throughout the CBTs. They ask the teen to do the same kind of self-assessment as the actors did in the film, asking some of the same basic questions:
   On a scale of 1–10, how would you evaluate your own driving skills? (Seeing things around you in general? Spotting hazards/troubles before they happen? Adjusting your speed to the flow of traffic? Maintaining a safe distance? Handling risky situations?)
   Clyde and Claudia then ask the teens to complete survey questions about their driving behaviors. The responses are recorded in the database for future correlation analysis.

(c) Component Walk-Through
Clyde and Claudia describe each of the driving scenarios and allow the teens to try each one:
   What's the Clue? Teens see a situation where there is an "embedded clue" that something risky is about to happen. The teen is to identify the "clue" by using the mouse to click on the object.
   Hazard Clicking which requires teens to recognize and identify hazards by using the mouse to click on items they believe to meet the definition given in the instructions.
   Driver Action which asks teens to apply the appropriate responses (speed up, slow down, go left, go right) to various driving situations.
   Where Is It? Teens are asked to use visual search and recall skills to answer questions.
   Risk O Meter which asks teens to evaluate the degree of risk compared to a previous driving scene on a scale of less, the same, more.

In each of the five types of driving scenarios, the teen's responses are recorded in the program database. The first response (first mouse click) to an exercise and in some cases, the last response is analyzed to identify response patterns at the conclusion of the program.

If the student responds correctly the first time, appropriate feedback is given and the exercise moves on. If the teen answers incorrectly, feedback is provided and for Hazard Clicking, Driver Action. and Risk O Meter, and the teen is required to repeat the scenario one time. If an incorrect response is given the second time, the teen has the choice to "move on" or to "try again." In What's the Clue? and Where Is It? the scene is played once again to demonstrate the correct answer and no repetition is required.

(d) Navigation Practice
This practice session/tutorial models the driving practice sessions. The practice can be accessed from the Home Screen when the teen signs on.

3. CBT #1: "Driving With Your Eyes Wide Open" (15 minutes)

(a) Purpose
The overall purpose of this CBT is to:
   Reinforce visual search as the bedrock component of the safe and skillful driving conceptual world view
   Break down visual search into its components—search to front, back, sides
   Provide elementary visual search practice (b) Conceptual World View/Visual Search
The "film within a film" now picks up on the first day of shooting. The discussion begins with Anne returning to our key idea of the graph that describes the difference between 16 and 18 year old drivers. The key point/question is now, "How do more experienced drivers see things in ways to anticipate and stay out of trouble?" The point comes out in the discussion that the failure to see other vehicles is the number one cause of accidents.

After speculating on this a while, the cast asks someone who actually embodies that improvement. This leads to the introduction of "Zack, the Pizza Delivery Guy". He is 19–20 years old and is an excellent driver who has to deal with a lot of pressures on the job . . . especially living up to all the pressures of being in the pizza delivery business.

The cast asks Zack about what he does now to see things that he missed when he was younger; e.g., "How do you now use your eyes to be a better/safer/more skillful driver?" Zack stresses that one big difference for him is that when he was first driving he felt overwhelmed with all the information that he was getting. Now he has learned to filter what's important from what's not and that this is a skill that can be taught and practiced.

(c) Visual Search Components
This segues into a discussion of the various components of visual search. To illustrate this, Zack goes out for a "drive" in the stage car (using rear screen projection) with Alan (the character who is most in need of developing this part of his driving skill set). In the course of their drive, Zack mentions, with illustrative driving examples pointed out by him, the following visual search techniques:
Search ahead, including concepts of:
   Distance search
   Visual lead time
   Maintaining search ahead
Searching to the side, including:
   Importance of lateral search techniques
   What to look for at/how to handle controlled intersections
   What to look for at/how to handle uncontrolled intersections In the course of their driving session, Alan reinforces a few ancillary points regarding safe and skillful driving; e.g., that Zack is a smooth driver who anticipates situations before they happen and takes corrective actions in plenty of time. It is stressed that this sense of "smoothness" is one of the main things that characterizes the more mature driver from the less experienced. Thus, this is one of the differences, in conjunction with not driving fast, not cutting in and out of traffic, or engaging in driving activities that might better be associated with immature "showing off".

(d) Visual Search Practice

The CBT concludes with a chance to practice the first element of visual search: search ahead. In doing so, the POV shifts so that it seems that the teen watching the CBT is getting behind the wheel.

The teen viewer is asked to identifying specific hazards in the environment. He/she does this in spite of possible distractions that might be closer to the driver. This leads us to ideas about "distance searching" and not getting "locked in" to whatever is right in front of you. This exercise involves an element of timing that requires the student to identify maneuvering and decision-making needs in advance in order to avoid last second reactions.

For example, the teen is asked to look ahead and move his/her mouse on to an oncoming potential hazard; e.g., pedestrians, car door opening, trucks unloading, cars pulling out. (Hazard Clicking.)

Each mouse click is recorded. When scored, as in the Certification Test, the number of correct responses is divided by the total possible hazards. This method evaluates performance in the hazard recognition domain. The immediate feedback lists the hazards missed for further emphasis during the next attempt.

4. CBT #2: "Taking A Closer Look" (30 minutes)

(a) Purpose

The overall purpose of this CBT is to:
Allow the teens to further develop their "visual search" techniques
Stress the role risk/benefit analysis and lifestyle issues play in safe driving (b) Visual Search Practice As the CBT begins, Alan is talking with the group about what he has learned in the course of his drive with Zack. In response to a question from Jack the Director, Alan mentions that he still has trouble integrating information from his rear view mirror with what's going on in front of him. Jack empathizes that this is a real problem for many young drivers and, in fact, is a skill that many experienced drivers also have problems with. Jack suggests that we have another visual practice session where we really concentrate on mirror use. This leads to another "driving exercise". In this case, Jack tells us to "practice putting it all together."

The first part of the exercise concentrates on mirror use and "search behind" techniques. In particular, it focuses on a series of exercises calling for using mirrors in conjunction to avoid accidents and "blind spots". For example a "Where is it?" exercise shows a white van approaching fast in the rear view mirror, disappearing, appearing in the right hand mirror, and moving into the driver's blind spot. The teen is asked "Where is it?" and to move his/her mouse and click on the area where the car is currently appearing.

Subsequent exercises (Hazard Clicking) call for the teen to click the mouse on potential hazards using all mirrors.

(c) Conceptual Model

As this practice comes to an end, the teen viewer is returned to the "film within film". At this stage, Heather launches a bit of a "counter-revolution" by stating that all this emphasis on visual search is really important, but good driving is more than just applying some kind of mechanical technique. "It's fine to say it's all about seeing," she says, "but what if you're too mad to see straight? Or what if you see something and you know it's risky but you decide to go ahead anyway?" In a sense, this is part of the natural rebelliousness of youth against the "authority figures" making the movie. In addition, it is part of our efforts to anticipate the teen viewer's reaction that this is just "another Driver's Ed. film" albeit in disguise. Finally, it's also part of our overall insistence that though we have to teach the model in a "sequential/additive" manner, it is still a" model where you apply all of the elements in an integrated manner and at the same time. Naturally, none of these words appear in the actual dialogue, but the concepts are there.

(d) Risk/Benefit and Lifestyle

Heather introduces a "problem scenario" and ask the experts how they would handle this situation. This situation involves the following elements—and is illustrated by the use of the rear screen projection technique with Heather in the stage car:

Heather is in the middle lane of the freeway. There is a truck right in front of her that won't move over or speed up. She has a car on her left-hand side in the fast lane that is too close to cut in front of. On the right hand side, she sees a car that's further ahead, but too close to change lanes. In short, it's a scary situation that calls for quick thinking.

It's about 7:45 in the morning. Heather has to be at work by 8:00. She feels she has about ten miles to go, so she feels that she's pretty close to making it, but isn't sure.

Heather is worried about the following:
Her boss has told her, "If you're late one more time, I'll fire you!"
Her mom has told her, "Whatever you do, don't crash the car!"
Her dad has told her, "I'll be really surprised if you hold on to this job based on your past behavior."

Heather then turns to Anne and says, "What should I do here? It seems like I only have two options: get fired or crash!" Anne then asks the other teens, "What would you do here?" The teen viewer is asked to click on each cast member to find out what each would do. A number of opinions are expressed including:

Dominic argues for some "quick driving moves"; e.g., "Close up on the guy in front of you and try to push him to go faster" or "Close up and then go into the left lane".

Alan argues for certain kinds of sophisticated coping strategies; e.g., "Pull over. Call the boss. Tell him you're stuck in bad traffic and you wanted to let him know you'd be late. And ask if you could pick up some donuts on the way in . . . "

Emma argues that the real need here was to be responsible and get up earlier so these kinds of situations won't occur.

After each teen is heard, Anne interjects that there are some key learning points:

The main message here is "Be safe"; e.g., nothing that could happen to you could be as bad as getting in an accident where you could be hurt or killed or where you could hurt and kill other people.

A secondary message is to be aware of the range of possible responses that are available for you once we have accepted "safety" as the primary issue. This is one of the big differences between immaturity and maturity. "Immaturity" sees the world as shrinking to one or two simple options while "maturity" sees a range of possible responses, prioritizes, takes action, and accepts consequences.

Finally, "maturity" involves looking at the kind of lifestyle issues that might be putting us in this kind of situation on an ongoing basis. Thus, she asks Heather to talk about why she finds herself in this kind of position.

Clyde and Claudia summarize key points and remind the teen to do the Parent-Teen activities.

IV. Parent-Teen Activity #2 (STEP 4)
 A: Time: 60–90 minutes, depending on driving routes chosen
 B: Place: At home and on the road
 C: Activity Objectives:
  To reinforce a sense of parental involvement/partnership around safe and skillful driving with teen
  To provide practice in identifying potentially hazardous real-world environments in the teen's world and discuss possible coping strategies
  To provide basis of discussion for activities in ensuing Workout Session and thus build peer awareness of potential hazards
 D. Instructional Elements/Sequence:
  1. "Hazard Mapping" Parent-Teen Driving Exercise (30–60 minutes, depending on routes)
  2. "Picking the Worst of the Worst" Discussion (30 minutes)
 E: Description:
 1. "Searching for Hazards" Parent-Teen Driving Exercise (30–60 minutes, depending on routes)

In this exercise, the parent and teen drive together the two or three routes that the teen most often encounters; e.g., to school, to work, to band practice, to a best friend's house, etc. It is also suggested that they try and drive the route at the time that the teen feels is most stressful; e.g., at night, during rush hour, when school lets out, etc. As they drive the route, the teen and parents take turns playing "driver" and "observer." The observer's role is to draw pictures and take notes on potentially hazardous environments/situations for later discussion. As an example of this, they might identify: an intersection where traffic merges from several angles into one lane; a stretch of road where people drive particularly aggressively or thoughtlessly (outside the local shopping mall); a place where pedestrians and bike riders cause trouble; or a "cruising" location where teen drivers may be more involved in looking at each other than at looking at the road, etc. Parents are also be asked to reinforce using mirrors effectively and talk about how that might reduce the "trickiness" of a given situation; e.g., people and cars coming at one from all directions and requiring the integration of information from multiple mirrors.

2. "Picking the Worst of the Worst" Discussion (30 minutes)
  After completing the driving portion of the exercise, the parent and teen discuss the hazards encountered with an eye towards prioritizing the 2–3 most challenging hazards. In doing so, they complete an exercise in the Student Workbook where they:
   Draw a picture of each of the hazardous situations
   Define the factors contributing to why each of these situations is hazardous
   Identify two or three coping strategies (based on such techniques as visual search) for dealing with each of these hazardous environments The teen completes a Learning Journal entry and is directed to bring this exercise and the sign-off form to the next Workout Session. The exercise forms the basis of a debriefing activity.

V. Workout Session #2 (STEP 5)
 A: Time: 60 minutes
 B: Session Objectives:
  To continue building a community of teens/peers where safe and skillful driving is valued and reinforced
  To provide teens a chance to discuss what they've learned so far both in the CBTs and in the Parent-Teen Activities
  To provide a chance to further develop visual search and hazard identification skills
 C: Instructional Elements/Sequence:
  1. Warm-Up: "Teen Introductions" Hazard Relay (5 minutes):
  2. "That Was Then, This is Now" Team Exercise (10 minutes)
  3 "Gap Rap" Small Group Activity (15 minutes)
  4. Trigger Video: "Watch Where You're Going" (2–3 minutes)
  5. Small Group Exercise: "Hazard Mapping" (20 minutes)
  6. Cool Down: "What's Next?" Presentation (3–5 minutes)
 D: Description:
 1. Warm-Up: "Teen Introductions" Hazard Relay (5 minutes): In this activity, the facilitator divides the group into two teams by asking the teens their names and writing them on two flipchart sheets. Each team is given a marker and told there will be a "hazard" relay race. The race lasts 5 minutes. Each group is directed to write as many hazards as they can think of on their team flipchart sheets; e.g., drunk drivers, blind intersections, people driving with their bright lights on at night, etc. This is done by passing the marker "baton" from team member to member. The facilitator then quickly debriefs by connecting the hazards identified to both the earlier CBT and Parent-Teen Activity experiences; e.g., "How many of these hazards did you actually see when you were out with your parents?" or "Does this remind you of anything you saw in the first CBT/ film?" By doing so, the facilitator sets up the agenda for the workout session as a whole.

2. "That Was Then, This is Now" Team Exercise (10 minutes): Staying in the same two teams, the teens work on an exercise where they identify and discuss what they learned during Parent-Teen Activity #1 when they asked their parent, "How did driving back then compare to driving today? What was safer? What was more dangerous?" One team is given a prepared flipchart and the topic, "What Was Safer?" The other team deals with, "What Was More Dangerous?" For 3 minutes, the teams work in separate corners of the room. After 3 minutes, the teams exchange places (or charts) and work on the other team's list, looking at what the team had done and adding any additional items from their own experience. At the end of the second 3-minute session, the facilitator takes the two separate sheets and posts them together at the front of the room. He/she debriefs by asking questions such as, "In general, when was it better to start driving . . . then or now? Does this help you understand your parent's point-of-view better when they are concerned about your safety? Do you think your parents understand you better and the world you have to deal with?" The teens are asked to jot down two or three items that they think would be new for their parents and to share these with their parents on their own time.

3. "Gap Rap" Small Group Activity (15 minutes): The teens are divided into small groups of three or four. Each group discusses what they learned during Parent-Teen Activity #1 when they asked their parent, "After 2–3 years of driving, what were you doing that made you a better, safer, more skillful driver? What did you change? How did these changes come about?" In doing so, the teens identify what they feel are the 3–4 best (most helpful) responses their parents gave and discuss why they feel that way. They are given a pad of 5×7 "stickies" (with each group having a different color). They write each of the best responses on a sticky and post them on a "Gap Rap" flipchart sheet at the front of the room. The facilitator reviews each sticky note (grouping "like" notes to form a model) and reads them aloud to the group as a whole. To further discussion, he/she occasionally asks what group came up with the sticky and asks leading questions; e.g., "Why was this helpful? When would you apply this?" At the end of the discussion, the facilitator introduces more general questions like, "What most surprised you about your parents' responses? Where are the biggest similarities/differences between more and less experienced drivers? How does this relate to what you've learned so far in the program?"

4. Trigger Video: "Watch Where You're Going" (2–3 minutes): The purpose of this video is to focus on the issue of hazard recognition and "prime the pump" for the hazard mapping activity to follow. In this video, we see a series of "quick hit" hazard situations; e.g., situations/environments where teens perceive possible risk and be prepared to take corrective actions. In the video, we see three or four "teen on the street" mini-interviews in a library setting. They are asked, "What makes you feel a place is too dangerous to drive . . . or what contributes your sense of hazard?" The teens describe a given area, intersection, time of day (the Hub) . . . and as they do so we dissolve to the actual situation/place they are describing. The effect is we see what the teen is describing as he/she "does commentary" as voice over. In the course of the film, the teens also talk about what they do to deal with the situation effectively and minimize risk.

5. Small Group Exercise: "Hazard Mapping" (20 minutes): The facilitator makes a transition by saying, "You've heard from these teens about what's out there . . . now I want to hear from you . . . " This will launch the hazard mapping exercise, where the following takes place:
    The teens are divided into groups of 3–4.
    Within each group, they compare their hazard maps.
    They draw a "composite" of their situations combining them into a "What's Your Worst Nightmare?" situation and draw picture on a flipchart sheet.
    Each team presents its work. The other teams attempt to identify strategies for coping with the situation effectively.

6. Cool Down: "What's Next?" Presentation (3–5 minutes)
    In this wrap-up session, the facilitator:
    Briefs the teens on the upcoming elements of the program.
    Congratulates them on their progress thus far.

VI. Computer Time Session #2 (STEP 6)
  A Time: 60 minutes
  B: Session Objectives:
    To make teens aware of the elements involved in risk/benefit analysis
    To allow teens a chance to apply and practice risk benefit analysis in a variety of typical situations
    To expose teens to the concepts of speed adjustment and space management
    To allow teens to practice applying speed and space concepts in a variety of situations and conditions
  C: Instructional Elements/Sequence:
    1. CBT #3: "Understanding Risk" (30 minutes)
    2. CBT #4: "Introduction to Speed and Space Management" (30 minutes)
  D: Description:
    1. CBT #3: "Understanding Risk" (30 minutes)
    (a) Purpose
    The overall purpose of this CBT is to:
      Define the greater degree of risk to which teen drivers are exposed and why this is so
      Identify specific clues and/or signals that contribute to risk in a given situation
      Discuss the concept of cumulative risk
      Understand the trade-off involved in performing a risk/benefit analysis
      Identify the degree of risk associated with a given lifestyle choice
    (b) Risk and Teen Drivers
    At the beginning of the CBT, we pick up with our "film within a film" cast. Anne sets the scene by reminding the cast that in our last CBT they talked about "Heather's problem scenario" about being late for work. Anne stresses that this kind of situation is what teens have to deal with all the time, balancing the amount of risk in a situation with the possible benefits involved. She suggests they talk about how to look at risk and benefits in a more mature manner. To get the ball rolling, she asks the teens, "How much greater degree of risk are teens at on the road than other drivers? More? The same? Less?" This question also appears as branch text for the teen to answer by click on the response. The cast will guess at a few answers . . . for example, Dominic says, "I know for a fact we're better drivers. Our reflexes are better. It's those old people who cause all the accidents . . . " Emma thinks it's about the same; teens aren't better but they are far more responsible than adults give them credit for . . . At this point, Anne shares a few sobering statistics about the greater risk exposure that teens actually face.
    Anne asks them "why" teens might be at more risk. Alan says, "I guess it's just a lack of experience". Heather retorts, "That's just a cop out. What do you mean by experience?" Anne replies, "In a way, you're all right, but there's still a missing element. Dominic is right when he says teens do have good reflexes and can handle cars well. Emma is right when she says teens are responsible people. Alan is right when he says it has something to do with a lack of experience . . . but what? What is it?"
    At this point, multiple choice questions appear, such as "Why are teens at more risk?" The teen viewer is asked to click on the best answer.
    As we return to the "film," Emma says something to the effect of, "Oh, I've seen something like that before. At school. A girl was getting her stuff together and jumped right out of the car. I had to slam on those brakes or I would've taken the door off . . . " Anne will then draw the key learning point . . . and the "missing element" that was talked about at the beginning of the CBT; e.g., teens tend not to perceive risks that more experienced drivers see . . . and they react less quickly as a result . . . and/or react with "panic stops" etc. that can themselves cause accidents. For example, Anne could ask Emma, "Did you know if anybody was behind you when you slammed on the brakes?" Emma will answer, "I don't know . . . I guess not . . . I guess I was lucky . . . " This will then lead to the introduction of the idea that individual risks can combine and multiply and form an overall "high risk/cumulative risk situation" where the chances of accidents are even greater.

(c) Clues/Signals

Clyde and Claudia introduce the What's the Clue, Hazard Clicking and Risk O Meter Exercises In the first exercise, the teen viewer sees a number of situations where there is an "embedded clue" that something risky is about to happen. The challenge is to see if the teen can identify the clue and that something is about to happen. A segment of film rolls for a few seconds as needed and then "freezes." The teen is asked, "What is the clue that something is about to happen? The teen clicks on his/her answer which is recorded. The film resumes and the teen sees the outcome.

You are driving through a crowded residential area. The car in front of you is going slower and slower. Across the street, a car pulls out of a parking space. Pause. "Click on the clue that something is about to happen." The video continues to show the remainder of the scene.

You are driving though a downtown area. A pedestrian runs into the crosswalk against the light. A car has just merged into your lane and has its brake lights on. Pause. "Click on the clue that indicates something is about to happen." The video continues to show the remainder of the scene.

The next set of exercises involve Hazard Clicking: The various hazards presented are: pedestrians, car door opening, trucks unloading, cars pulling out.

(d) Cumulative Risk

At this point, we move to the next exercise, "Risk O Meter". Anne positions this exercise by stating that there are two purposes:

To see how multiple risks can exist in a given situation

To see how this cumulative effect influences overall perception of risk

The teen viewer is asked to evaluate the comparative risk of each situation on a "Risk O Meter" that is at the bottom of the screen; e.g., a "thermometer" where the viewer can drag a pointer between:

Less risk

The same amount of risk

More risk

As examples of a risky situation, footage of the following is used:

Cars merging from the right into freeway traffic, with a short merging lane where sometimes cars can "gun it" and merge into traffic quickly and/or have to stop and start.

Cars are aggressively cutting in and out of traffic.

There are lots of big trucks that make visibility difficult.

There are highway construction workers ahead who are dropping cones to create a second "merge left" situation and are walking close to traffic.

For each example, the viewer completes his/her entry and then clicks "Done" on the screen. Clyde and Claudia through voice over feedback explain the correct response. If they want to, the teen viewers can go back and review after hearing the explanation of situation or go on to the next one. The responses and number of iterations are recorded in the database.

When the "film within a film" resumes, the discussion focuses on "how to avoid getting into trouble once you perceive there's a risk". The cast members briefly offer advice on coping strategies; e.g., slow down, use your mirrors, maintain space, keep your car in good shape, and don't drive when you're tired or stressed. This introduces the notion that there is an "internal" aspect to risk that has to be factored in.

(e) TradeOffs

This leads to our next topic area: "Risk/Benefits Trade-Offs." Dominic begins this discussion by saying, "Sometimes you're really aware that what you're doing is risky . . . but you go ahead anyway . . . You choose to take a risk because there is something you want . . ." Emma responds by saying, "Yeah, you say it makes sense to take a risk . . . but that doesn't make sense." Heather laughs and says, "Yeah, it's always easy to see it coming from the other guy . . . It's always his fault not mine that something's dangerous."

Jack then suggests Dominic help him illustrate a point by taking a drive in the "stage car." We see Dominic's drive.

"The coach of his summer league baseball team has told him, "If you're late for practice one more time, you're going to be suspended from the team."

Realizing that he's running a risk of being late, Dominic drives in an aggressive, risky fashion. He figures better a "slight chance" of being hurt, a "medium chance" of getting a ticket, against the "certainty" of being cut from his favorite sport.

In the video, Dominic makes it with a few minutes to spare.

We return to the discussion and Dominic says, "Well, did I do the wrong thing? What else could I have done?" In response, Anne says, "Let's take another look" at that situation and look at it from a couple of different perspectives."

First, there's a question of whether or not you're driving recklessly actually got you what you wanted.

Second, there is a question of how much risk you're willing to accept for yourself.

Finally, there's a question of how much risk you're willing to accept for the people around you.

Anne says, "I'm wondering if driving recklessly got you what you wanted?" We see the scene again, but with Emma as the driver.

Her drive is much smoother, using "normal" driving habits. She drives the same route, and gets to the same destination only a few seconds after Dominic.

We see how much time Dominic actually saved . . . e.g., only seconds, and thus far less than he perceived. We now see both drivers, showing Dominic feeling hassled and stressed, narrowly avoiding accidents, demonstrating risky behaviors, while Emma is cool, calm, collected, and mature. We see Dominic's behavior from the reactions of other drivers, who he cuts off, almost hits, etc. In this version, he comes off looking far less attractive and competent, not "cool", just kind of scattered. So something Dominic wanted . . . to be seen as cool and confident . . . is not perceived by the people around him . . . who just see him as a danger and a bit of a jerk.

Based on this information, Anne asks, "What kind of trade-offs are you willing to make here? If there's a high chance, that you'll save two minutes by driving fast against a low chance of killing someone or yourself, would you take it? How about the higher chance of losing your driving privileges? Or having your insurance go up? When is the risk worth taking for you?" The point is that everyone sets this level differently, but if we're aware of how little we're really gaining against how much we're putting on the line, we should re-think taking unnecessary risks. A big part of this then is having good information. This leads to very brief interactive questions the viewers answer:

If normally takes 15 minutes to drive 15 miles at 60 mph. How much time do you save by driving 70 instead of 60 mph?

If you're going three miles in city traffic, how much time you save by cutting in and out of traffic aggressively? 5 minutes? 10 minutes? None?

Finally, Anne makes the point that there's the issue of how much risk you are accepting for others. For example, would Dominic have driven the same way with a small child in the car? His brother? Anyone you care for who is easily scared? The learning point here being that every time you drive you're inserting an element of risk for everyone on the road who will be seeing you from their own POV. This leads to our final point for the exercise, which is how driving defines who you are in a larger, lifestyle perspective.

(f) Risk and Lifestyle

In the final part of the CBT, Anne makes the connection between how we drive and how we live; e.g., driving is an expression of who we are and what we want, with an associated element of risk. She will ask the group, "What kind of person are you? What do you want out of driving? What kind of message are you sending through your driving? What kind of risk is involved?" The cast will reflect on this in a light-hearted, perhaps a little self-conscious way, but with a touch of seriousness. In doing so, they come up with some of the following answers . . . .

Dominic: "I'm the type of guy who has it together. I want to be cool and show people I'm in control . . . I like to drive fast and I drive a car that lets me drive the way I want to, I like the freedom of driving fast. I was willing to take the risks involved . . . or at least I thought I was . . . now I know I'm not willing to hurt myself or someone else."

Alan: I think I'm a relaxed, laid back guy who has got it together. So I try and be a good driver. I don't want people to think I'm a jerk. On the other hand, I don't want to cave in when I am pressured."

Emma: "I see myself as very responsible. Driving is just a means of doing that. I drive safely because I can't afford not to. So I don't drive dangerously. I want people to think I'm mature."

Heather: "I don't know . . . I want to be a good driver. I don't really get to drive enough . . . but I do like the idea of being free . . . And when I do drive, it's easy to get scared. It's kind of intense. But I don't want to hurt anybody."

At the end of the discussion, Anne tells the cast that they will be returning to this issue of lifestyle choices and driving a little later on; e.g., they have just scratched the surface here. In summary, Clyde and Claudia continue this theme. Claudia turns to the teen viewer and say, "How about you? So what kind of person are you? What do you want from driving? What kind of message are you sending when you drive? What kind of risk does that involve? Why don't you just think about it?"

2. CBT #4: "Introduction to Speed and Space: Key Concepts" (30 minutes)

(a) Purpose

In this CBT, we cover the basic concepts of speed adjustment and space management. This translates into more specific speed and space "tactics" that will be taught in CBT #5. As such, the overall purpose of CBT #4 is to:

Define how speed contributes to the risk and severity of accidents

Define the impact of speed on stopping distances under various road conditions

Describe the relationship between speed and visibility, both in normal and "difficult" conditions Discuss the concept of relative speed in maintaining a "space cushion"

(b) Speed and Accident Risk

At the opening of the CBT, Jack introduces Lori to the group as a young person who really embodies safe and skillful driving techniques. She's there to show them what she's learned in becoming a better, more mature driver. Lori is a stunt driver. She conveys to the group the race car driver's true mentality—that the only place for speed is on the track. She conveys the impression that driving on the track at high speeds is actually less dangerous than "normal traffic." "On the track," she says, "You're surrounded by professionals who know what they are doing. On the street, it's amateur hour; you take your life in your hands every time you drive."

Lori tells the group there are a couple of key lessons of driving skillfully and in a safe manner.

"Speed kills"; e.g., it's the number two reason for fatalities. (Failure to see other vehicles is number one)

"Space is like money in the bank"; e.g., the more you have "invested" the better you feel and the safer you are.

Lori then asks the group, "How much do you think speed adds to your chance of being killed in an accident?" This question would also appear to the teen viewer as a quick "multiple choice" item; e.g., "How much do think your chances of being killed in an accident increase between 55 and 65 mph?" The teen viewer responds, gets the correct feedback; e.g., your chances double. Then we return to the cast discussion. Lori adds, "And they triple from 55 to 75 mph . . . So just a little bit more speed is the difference between walking away, going to the hospital, or being killed."

"But speed is a critical part of driving, "she continues. "If cars didn't go faster than horses . . . why bother? So it's a tool you need to understand and know how to use . . . " She stresses that the three key things that determine how much speed you can use are:

Road conditions (how the car handles and stops)

Visibility (how far you can see)

Traffic (how much space you have)

Jack queues up some footage of racecars on the track. Lori says that this is the best place to talk about speed in a safe, controlled fashion and to practice the skill of handling speed effectively.

(c) Stopping Distances and Road Conditions

Lori briefly sets up a discussion about stopping at various speeds and under various types of road conditions.

At this point, Lori puts a target out on the track; a crash dummy "Joe," to represent a human being. She put it about 100 feet away from a designated "stop point". She asks the group, "Okay, if I'm going 30 and I see Joe Pedestrian when I reach this point, will be I be able to stop in time? Yes or No?" The cast decides and the teen viewer is asked to register his or her response. Lori drives up, hit the brakes at the "stop point", and comes up just short of hitting the "target" Feedback is provided that you have to be a pretty good driver and be fully alert, but you can stop a car at about 100 feet under these conditions.

Lori then moves the "target" out to about 200 feet from the stop point. She says, "Okay . . . now I'll be going 60. Twice as fast . . . and the 'target is more than twice as far away. How about now? Can I stop in time?" Again, the cast/teen viewer decide. Despite her best efforts, Lori plows right into the Joe Pedestrian. Feedback is provided that the required stopping distance here is actually 300 feet; e.g., the length of a football, field meaning the actual stopping distance at 60 mph has tripled from that required for 30 mph.

A variation of this exercise showing stopping distances under less than optimal road conditions appears next.

In part one, a cone is left out on the course, represents the stopping distance at 30 mph under ideal road conditions. We ask the teen viewer to decide if the car can stop in time at 30 mph for a wet track? How much distance is needed? 105 feet? 115 feet? 125 feet? Feedback is provided to the viewer.

In part two, we repeat the same exercise but this time with the speed being 60 mph. The differences and problems here are even more dramatic than at the slower speed.

To summarize, Lori says, "Don't expect to get dry weather stops in wet weather conditions. Actually you need 10–15% more room to stop. It's about the laws of physics. Cars do turn faster then they brake, so sometimes turning is an option if you can't stop in time.

(d) Speed and Visibility

Lori makes a transitional point about how in each of these cases she reacted as soon as she saw the need to stop. So clearly there is a critical connection between speed, visibility, and safety. The bottom line is you can't out drive your "sight distance". Lori explains that two factors define your sight distance:

Your speed

How far you can see

Using driving scenario footage, Lori explains this concept through the following visual examples:

Example 1: You are driving at 60 mph. That means you need at least 300 feet to stop. Visibility is excellent and you are using visual search ahead/distance searching techniques. You see a stalled car 450 feet in front of you. You apply the brakes and stop in plenty of time. Your "sight distance" was much greater in this instance than the time it took to stop.

Example 2: Again, you're driving at 60 mph. So your stopping distance is still 300 feet. However, this time there is a heavy fog that limits your "sight distance." As soon as you see the stalled car, now just 250 feet away, you slam on the brakes but hit the car. That's because you were driving faster than your "sight distance" would allow.

The key learning point is "Don't drive any faster than what your eyes can see." At this point, Lori asks the cast to brainstorm all the conditions that can limit our field of vision. They identify a number of conditions and form a list. The teen viewer is told that he/she can click on any of these items to receive driving tips; e.g., "Night Driving" tells us about not out-driving our headlights and maintaining a 4 second space cushion. The list of these "limiting conditions" include the following:

Night driving

Fog

Driving behind trucks

Blind curves

Blind intersections

Parked cars

Fatigue/eye strain

Dirty windshield (e) Relative Speed and the "Space Cushion"

Lori returns to the CBT by stating that these problems of speed and sight get most complex when we're dealing with heavy traffic conditions where we feel there's a high expectation of risk and lots of changing variables. Clearly, we can't be always trying to calculate our "sight distance" in our heads. It's just too complicated.

The basic idea is to try and keep as much space between yourself and everyone else on the road as you can. This is especially true of cars in front of you. Rear end crashes are the most common because cars follow too closely and don't leave themselves enough space/time to stop. Clearly, the more space you have, the more time you have to react when they "foul up" or when you do.

Heather asks how to calculate how much space you need to leave between you and other cars.

Lori explains the "two second space cushion rule" and how it is calculated. At the minimum, you want a "two second" space cushion. Ideally, you'd like to have four seconds. Lori asks Jack to cue some road footage. Heather and Lori go for a drive in the stage car to practice the two second space cushion rule. After each practice session the interactive screen asks if there is enough space between Heather and the car in front of her. The viewer has the choice of "Yes" or "No." The video continues and provides feedback.

Following this exercise, Clyde and Claudia bring the CBT to an end by thanking Lori for her input. They tell the teen viewer that in the next CBT we'll revisit some of these concepts through some advanced driving techniques that can be used. In the meantime, they encourage the teens to practice what they have learned during the next at-home activities with their parents.

VII. Parent-Teen Activity #3 (STEP 7)

A: Time: 60–90 minutes (depending on length of driving practice)

B: Place: Home and on the road

C: Activity Objectives:

To continue building a sense of parental involvement/ partnership around safe and skillful driving and the teen's implementation of concepts taught in the program To introduce parents and teens to the idea of "interactive driving" and to model how it should be done in a positive, realistic, and constructive manner To reinforce with parents and teens some of the key concepts discussed thus far in the curriculum to provide parents and teens with an opportunity to perform "interactive driving" while applying key concepts from the curriculum D. Instructional Elements/Sequence:

1. Take-Home Video: "Interactive Driving" (10–15 minutes)

2. Parent-Teen Interactive "Drive Time" Exercise (40–60 minutes)

E: Description:

1. Take-Home Video: "Interactive Driving" (10–15 minutes). The parents and teens are directed to watch this video together to get a sense of what's involved in the whole idea of interactive driving and how it can be powerful tool in improving good driving behaviors (a) Purpose The overall purpose of the video is to:

Reinforce key safe driving concepts and key driving skills that have been covered thus far for the teen viewer Provide a conceptual understanding of what "interactive driving" is how it should work, and what the benefits are of this technique Model "interactive driving" on a sample parent-teen driving scenario (b) Video Introduction At the opening of the video, we're back on the set with Anne and the teen actors. She says that she's been thinking of a new concept to help develop skills we've covered so far called "interactive driving." She tells the cast she wants a volunteer to try it out and report back on how well it works. She describes "interactive driving" as a partnership between parents and teens . . . although the technique can be used with peers as well. As such, a "round" of interactive driving consists of two components:

First, the driver does what's called "commnentary driving"; e.g., explaining what she's doing and why, just like an airline pilot learns.

Next, the passenger gives a "feedback session" where he/she explains how he/she felt during the driving session and provides constructive feedback on what was done well and what might be improved.

In the course of this explanation, one cast member objects that, "Oh, does that mean I have to sit there and have my parents nag me about how I drive?" Anne responds that what makes this different is that this is really an opportunity to talk "adult to adult." Explaining what you're doing behind the wheel and why . . . in a way that will help parents appreciate what you're learning in this program . . . plus, you get the opportunity to evaluate your parents' driving and to help them.

Anne stresses that an interactive driving session consists of two rounds where both teen and parent get a chance to play driver and passenger roles. She asks for a volunteer to give the concept a try. Emma is selected to drive with Jack in the stage car.

Emma demonstrates the following in her commentary:
The process of commentating on salient items
Using visual search techniques, including mirror use
Defining your "sight distance."
Recognizing hazards
Speed adjustment
Space management, including the "24 second rule"

We also see Jack model in a constructive manner giving "feedback" that's helpful and constructive. At the end of the video, we see the two of them change places and start a new round.

2. Parent-Teen Interactive "Drive Time" Exercise (40–60 minutes)

At this point, the parents and teens are referred to the Parent Guide and asked to do at least two rounds of "interactive driving", with each participant playing both the driver and the passenger role. Both parent and teen are given guidelines on how to carry out their respective roles. The Parent Guide includes the driving techniques that they should be focusing on; e.g., visual search, speed adjustment, space management, etc. It also includes specific tips on how to give good feedback, including the following points:

Focus on behaviors not personalities
Start by focusing on 2–3 things the driver did well
"Stay in your own chair" when it comes to more negative perceptions and feelings; e.g., "I felt a little afraid . . . " not "You were driving recklessly"
Focus on improvement statements that the driver can do something about rather than negative judgments; e.g., "Try looking a little further down the road" not "You really don't look down the road much, do you?"

The teen completes a Learning Journal entry and is reminded to provide the sign-off form at the next Workout.

VIII. Computer Time Session #3 (STEP 8)

A: Time: 60 minutes

B: Session Objectives:
To expose the teen to specific safe and skillful driving techniques that will allow him or her to make best use of speed and space management concepts
To give the teen viewer the opportunity to practice the various components of the safe and skillful driving conceptual model in a variety of driving scenarios
To revisit key learning points from the program.
To help the teen prepare for the certification test by providing sample test questions with feedback C: Instructional Elements/Sequence:
1. CBT #5: "More on Speed and Space: Advanced Techniques" (30 minutes)
2. CBT #6: "Putting It All Together" (15 minutes)
3. CBT #6: Practice-Test: (15 minutes)

D: Description:
1. CBT #5: "More on Speed and Space: Advanced Techniques" (30 minutes)

(a) Purpose

The overall purpose of this CBT is to:
Provide the viewer with advice and practice on advanced speed adjustment and space management techniques in the following situations:
Entering a line of traffic (merging)
Maintaining a space cushion ahead and to both sides
Recognizing blindspots
Expose the viewer to a variety of scenarios where he/she must make good decisions based on all of the driving skills curriculum content (b) Advanced Speed and Space Management Techniques We begin on the set with Anne asking Heather and Dominic to race to the car on the set. Dominic wins. We see a replay of the race. Anne then uses this to illustrate the fact that two cars cannot occupy the same space at the same time, and that drivers do not need to get "greedy". Techniques for entering a line of traffic; e.g., getting your speed to match up with the speed of the traffic are outlined. We see Heather doing the kinds of things that teen drivers often do; e.g., coming up too slowly and having to stop. Jack provides corrective feedback. Dominic takes a turn demonstrating his merging technique. Corrective feedback is provided.

Maintaining a space cushion to the sides of your vehicle: Anne and Jack talk about the hazards of being too close to adjacent vehicles and/or sitting in their blind spots. Clyde and Claudia, through voice-over, use film footage of driving scenarios to demonstrate appropriate driving behaviors near parked cars, to avoid blind spots, etc.

At the end of the exercises, the cast expresses feelings of being overwhelmed by driving. Clyde and Claudia tell the viewer "Okay, we've thrown a lot of stuff at you. Here's a chance to get behind the wheel and practice". The teen viewer spends the remaining part of the CBT practicing advanced speed and space "driver actions" where he/she is also asked questions to justify the driver action taken. These driving scenarios are segmented into scenes, with the environment and problems constantly changing. In all, there are 8 to 10 driver actions in which the teen viewer performs the following types of actions:

Using visual search to indicate awareness of hazards
Slowing speed to maintain proper space
Increasing speed to adjust with traffic flow
Moving left or right to practice merging effectively
Speeding or slowing or changing lanes to show side space management
Matching speed to visibility conditions and traffic For each element, corrective feedback is provided if an incorrect selection is made. When a correct driver action is taken, a multiple-choice "justify" question appears for the teen viewer to indicate why that decision was made. The teen viewer is given the choice to "try again" or "continue" after completing the first iteration. The exercises end when the viewer feels he/she has successfully completed the practice. Clyde and Claudia summarize the CBT and wave goodbye. Data on the driver action chosen is recorded in the database.

Cumulative teen responses indicate behavior patterns that are being validated through additional types of testing of the teen drivers. When scored for individual teens, these scenarios provide feedback to the teen regarding performance in the visual search, speed and space domains.

2. CBT #6: "Putting It All Together" (15 minutes)

(a) Purpose

The overall purpose of this CBT is to:
  Allow each teen viewer a chance to revisit the teen cast member self-assessments and also discover their own key learnings from the program
  Provide the teen viewer with a chance to complete a sample "Certification Test"

(b) Revisiting the Self-Assessment

We begin on the set with Anne stressing to the cast that as the "film within a film" is drawing to a close, it's a good time to start discussing what they've learned in the course of making the movie and applying it to their real world environments. A key element of this is thinking about what kind of person you are and what you want out of driving; we reconnect with the self-assessment activities that occurred earlier in the program. To model how this works, we flash back to revisit the questions that Anne asked during the auditions:

Remember the questions, "How do you want to see yourself as a person? And as a driver?" and "How do you want the following people to see you as a driver and a person: Peers? Parents? Other Drivers?" Have there been any changes in this now that you have completed the program? If so, what are they? At this point, Emma models the desired behavior by stating that whereas before she wanted different people to see her different ways, now there is one coherent image; e.g., she wants to be seen as a safe, skillful, mature driver.

On a scale of 1–10, how would you evaluate your own driving skills? (Seeing things around you in general? Spotting hazards/troubles before they happen? Adjusting your speed to the flow of traffic? Maintaining a safe distance?) Where have you improved? Where do you still need to improve? What can you do to improve in those areas where you still feel weak? Dominic admits that he's been "taken down a peg" by the program, whereas before he gave himself a "9", now he realizes there are areas where he can improve. On the other hand, Alan stresses that he feels his "visual search" skills have indeed improved.

In asking these questions, Anne allows us to see how the cast has changed and to identify some possible strategies to both improve driving skills, and increase parental involvement.

After the cast is done, Anne thanks them for their efforts in trying to take an honest look at themselves. She reminds the participants that there will be one more "wrap-up" discussion about lifestyle followed by a "cast party".

3. CBT #6: Practice-Test: (15 minutes)

In this final CBT activity, the teen viewers take a sample version of the Certification Test which allows them to assess the knowledge, skills, and attitudes gained in the program. They are reminded of the resources available to them: questions in the back of the Student Workbook, "Greatest Hits" video, and the Practice Sessions on the CBTs. Clyde and Claudia also remind the teens of the items they will need to take to the Certification Test session.

IX. Parent-Teen Activity #4 (STEP 9)

A: Time: 60–90 minutes (depending on length of driving practice)
  B: Place: Home and on the road
  C: Activity Objectives:
    To continue building a sense of parental involvement/partnership around safe and skillful driving and the teen's implementation of concepts taught in the program
    To allow teens and parents to practice some of the "advanced" driving behaviors taught in Computer Time #3 (STEP 8) and learn more about ABS brakes.
    To allow teens and parents a chance to create an "action plan"
    To provide teens with an opportunity to prepare in more depth for the Certification Test and to review their readiness to complete the test with their parents
  D: Instructional Elements/Sequence:
    1. Homework assignment: Reading about ABS brakes (5–10 minutes)
    2. Parent-Teen Advanced Techniques "Drive Time" Exercise (30–45 minutes)
    3. Parent-Teen Action Planning Session (15 minutes)
    4. Pre-certification Review Materials review session (15–30 minutes)
  E: Description:
    1. Homework Assignment: Reading about ABS brakes: (5–10 minutes) The teen is referred to the Student Workbook to complete a reading assignment that compares and contrasts cars with and without Antilocking Braking Systems (ABS) brakes. The material provides techniques for stopping quickly with each type of brake and instructs the teens to learn which type of brakes are installed in the vehicle they drive. Practice stopping is also recommended in this material.
    2. Parent-Teen Advanced Techniques "Drive Time" Exercise (30–45 minutes)
    At this point, the parents and teens are directed to go out and practice together some of the "advanced driving" techniques discussed in Computer Time #3 (STEP 8). The teen will do the majority of the practicing, with the parent concentrating on giving good feedback and demonstrating key points as necessary. The specific activities here involve:
      Entering a line of traffic and adapting speed to traffic. For this exercise, certain types of key locations are suggested to practice this behavior; e.g., freeway on-ramnps, "Yield" lanes leading into major thoroughfares, etc.
      "Panic stops" and emergency braking, with and without ABS. For this exercise, the parent would find a quiet street or a deserted parking lot to practice. The parent could also review the family cars with the teen and make sure he/she understands which ones have ABS and which do not.
      Maintaining a space cushion to the sides of your vehicle. Again, in this exercise, the teen could perform "commentary driving" on this aspect as he/she negotiates different driving environments.

Parents are given pointers, modeled after the CBT driving scenarios, and are urged to ask the teen driver questions along the route to evaluate visual search and hazard recognition skills.

This exercise includes a reminder on how to give good feedback so that the session will not degenerate into anything hypercritical or personal.

2. Parent-Teen Action Planning Session (15 minutes)

Using the guidelines provided in the Parents Guide, the parent then participates in an action planning session with the teen. The "Revisiting the Rules of the Road" and "Goals" worksheets contained in the Student Workbook facilitate this process. Based on their own driving experiences with the teen during the Parent-Teen Activities, the parents discuss whether or not they agree with the teen's assessment and areas of difference will be reconciled. As a result/reward of this session, the parent and teen will:

Develop 1–2 goals to help the teen improve driving skills after the program has ended Review driving privileges and extend any the teen has earned through his/her participation in the program Pre-certification Review Materials review session (15–30 minutes)

As a review tool, all questions from which the certification test multiple choice questions are derived are printed in the back of the Student Workbook. Parents are encouraged to assist their teens in the review of this material.

"Greatest Hits Video: Review of Key Ideas (7–8 minutes)

This video recaps key issues and helps teen viewers prepare for taking the Certification Test. The video consists of short clips that reinforce key points about each of the key areas presented in the CBTs. In the video, Clyde and Claudia serve as voice-over hosts for snapshots of the dramatic video contained in the CBTs; e.g., "Remember we then learned about risk or remember when Heather started a revolution?" The idea is to keep it a fairly fast-paced review of the key lessons.

The teen completes the final Learning Journal entry.

X. Workout Session #3 (STEP 10)

A: Time: 60 minutes

B: Session Objectives:

To present the idea that "how you live is how you drive"

To think about the benefits associated with mature behavior

To think about what kinds of risks teens take and why

To identify the kind of risky behaviors that can be correlated to risky driving

To allow participants to apply these concepts to the kinds of social interactions that teens routinely face To allow teens to start thinking about how to identify possible coping strategies and to verbally defend making the "right choice"

To encourage teens to focus on applying the skills and techniques they have learned.

C: Instructional Elements/Sequence:

1. Discussion of "How You Live is How You Drive" (5 minutes)
2. Trigger Video: "The Cast Party": Part 1—"Lifestyles and Driving" (2–3 minutes)
3. Large Group Discussion: Risky Lifestyle Choices (10 minutes)
4. Trigger Video: "The Cast Party": Part 2—"Heather's Choice" (2–3 minutes)
5. Video Debrief: "Looking at Both Sides" (10 minutes)
6. Trigger Video: "The Cast Party": Part 3—"Dominic's Dilemma" (2–3 minutes)
7. Small Group Exercise: "Dominic's Dilemma Activity" (15 minutes)
8. Reviewing the Learning Journals (5 minutes)
9. "Cool Down" Presentation: What's Left? (2–3 minutes)

D: Description:

1. Discussion: After reviewing with the teens where they are on the curriculum roadmap, the facilitator asks the teens to jot down what the phrase "How you live is how you drive" means to each one. These notes are written in the Student Workbook. A brief discussion of their thoughts leads into the other activities of the workout.

2. Trigger Video: "The Cast Party": Part 1—"Lifestyles and Driving" (2–3 minutes) Next, the video discusses the three key elements:

How you live is how you drive

Risky lifestyle choices correlate to unsafe driving; if you take a lot of risks in your life, you're bound to do it behind the wheel.

"Maturity" here involves making the right choice in a difficult situation and being able to defend it in a way that makes you feel good about having made it Anne reminds the cast that there will be a cast party that evening and that they are all encouraged to bring along a couple of guests, if they wish.

3. Large Group Discussion: Risky Lifestyle Choices

The facilitator asks, "What are some of the risky lifestyle choices that teens might make?" Suggested answers:

Drinking

Drugs

Unsafe sex

Fighting

Showing off

Law-breaking

Doing "crazy stuff"

Stealing/shoplifting

Staying out late, breaking curfew

Carrying weapons

Not wearing seatbelts

The facilitator asks, "If it is so obvious, why do some teens tend to make risky choices?" Possible answers here include:

Everybody else does it.

It's fun.

It feels good (short-term).

Want to be noticed.

Desire to be different.

It's cool.

Boredom

Desire to explore.

It seemed like a good idea at the time.

It was a joke, dare.

Belief that risky actions are mature.

Get back at my parents.

The facilitator circles those items that "the data says" most directly correlate to risky driving; e.g., drinking, drugs, unsafe sex, and provides underlying scientific data on a very high-level basis, including statistical evidence. At this point, the facilitator would ask, "Okay . . . so these are the behaviors we can all recognize . . . and we know that they can be bad choices . . . The question then is, "How can we make the right choices and defend them in a way that makes us feel good about ourselves?"

4. Trigger Video: "The Cast Party": Part 2—"Looking At Both Sides" (2–3 minutes)

In this video, we see the first of two scenarios featuring our "cast" from the "film within a film" at a going-away cast party. The purpose is "moments of truth" where teens are under real-world pressures to engage in risky behaviors and must defend making the mature choice. We show how these issues can surface in the moment in an unexpected, spontaneous way and that they involve real issues that actually impact the lives of teens. Our first scenario involves Heather.

Friends arrive at the party to join Heather and meet Heather's new "cast" friends.

When they discover that Heather has a car, Heather's friend suggests that they leave the party and go downtown and do some "cruising" for boys. This is a ritual on Saturday nights in their town and a sign of "maturity" to take part. When Heather looks over she sees the alcohol that they are pouring into cups.

Heather resists by saying that she is not sure if she wants to go cruising. She wanted her "old" friends to meet her new friends. Her parents have only told her to have fun and be back before midnight. So there could be some latitude in these instructions. The friends tell her that she needs to "stop being so square" and such a "goody two-shoes" and so "normal". As they have some truth to them, these accusations sting her a little. The video ends on a note of uncertainty about what will happen next.

5. Video Debrief: "Looking at Both Sides" (10 minutes)

In the debrief that follows, the facilitator says, "Heather has a couple of choices here—go cruising or stay at the party. Let's look at both sides of this . . . " He/she conducts a large group discussion where the following questions will be asked and responses noted on a flipchart:

What are the positive and negative outcomes of going for a drive?
  Positive: Impressing her friend, looking cool, meeting some guys, making new friends, etc.
  Negative: Getting busted, having an accident, being caught with alcohol, losing driving privileges, losing friends, etc.
What are the positive and negative outcomes of staying at the party?
  Positive: Feeling good about keeping her word, not allowing herself to be bullied, standing up for herself, etc.
  Negative: Looking like a "goody two-shoes." maybe alienating her friend. missing out on some "fun", etc.
What is clearly the more "mature" choice here? Would you accept the offer? Decline the offer? Or try to bargain? (We believe the right choice here is to decline the offer and stay at the party.)
What tactics/options can Heather use to defend her choice and feel good about herself? These can include:
  I gave my word. I'm an honest person. Don't you want me to be straight with you too?
  If you really like me, don't put pressure on me to do something I don't feel good about.
  We can go driving another time when you haven't been drinking.
  It's Friday night. The road is crawling with cops looking for teenagers. Do you want to get busted for sure" How would you feel about spending the night in jail?
  Why don't we go talk with Anne or Jack? Maybe they could get you in the movies!

The facilitator then asks for volunteers to respond to each of the questions and make sure that key points emerge. Among these will be the idea that things are never a simple matter of either/or choices. Options always exist. As such, this will reinforce the same idea that was presented in Heather's "problem scenario" about being late for work that appeared in CBT #2.

6. Trigger Video: "The Cast Party": Part 3—"Dominic's Dilemma" (2–3 minutes)

At the beginning of the film, Dominic is at the party with his girl-friend, Schylar. She is a "party girl" and a free spirit.

Schylar suggests that they leave the party. She mentions that Dominic has his Dad's Firebird and it would be great to go out for a drive in the warm, night air. She says it would be fun to "air it out a little" and see what "Daddy's car can really do". She also suggests that it might also be nice to find a place to park and have a "little fun." Dominic responds that he promised his dad he would only use the car to go to the party and come back. Schylar scoffs at this and says. "What he doesn't know . . . won't hurt him . . . " The video ends on a note of uncertainty about what will happen next with Jack mentioning the "Bloopers" he has queued up. Will they go driving or stay at the party?

7. Video Debrief: "Dominic's Dilemma" (15 minutes)

In the debrief that follows, the facilitator says, "Dominic has a couple of choices here—go driving with Schylar or stay at the party." He/she has the participants work through this problem on their own by dividing into two groups and completing the end of the movie—one with a Dominic stays at the party theme; the other with a Dominic goes off with Schylar theme. The teens are instructed to discuss:

What are the positive and negative outcomes of going?
What are the positive and negative outcomes of staying at the party?
How can Dominic defend his choice in a non-wimp manner?
What tactics can he use?

The teens are asked to portray their movie outcome by drawing a poster for the lobby of the Movie Theater and to give it a title. Each group presents the drawing and explains how Dominic could handle the situation. The facilitator summarizes the key learnings from the exercise.

8. Reviewing the Learning Journals (5 minutes)

The facilitator asks the teens to look at their Learning Journal entries in their Student Workbooks and identify the three biggest changes in their driving as a result of the program. The teens discuss how they can continue to improve as safe, skillful drivers.

9. "Cool Down" Presentation: What's Left? (2–3 minutes)

The facilitator tells the teens they can "cool down" as the workout is now almost over. He/she says., "As this is our last session, let me tell you about what you'll be doing for the rest of the program." He/she gives a brief discussion of the following:

Handle any questions the teens have about the Certification Test.
Encourage them to continue to value safe driving.
Congratulate them on their progress thus far.
Optional: As a reward for completing the three "Workout" sessions, the facilitator can then ask each teen to come to the front of the room and give him/her a little momento . . . ADEPT tattoo, pen or other item.

XI. Certification Test

A; Time: 60 minutes
B: Description:
  The certification test is comprised of test questions and activities that sample the entire domain of subject material addressed in the program. The certification test measures the overall course mastery as well as the six individual subject areas addressed in the program. The test uses assessment questions in a multiple-choice format as well as driving scenarios that use full motion video.

This last computer time is the certification test. It is comprised of the following:

Exit Interview questions which survey the teens' perceptions of the program

Multiple choice questions, all of which are taken from the questions located in the Student Workbook Driving scenarios like those found in the other CBTs Re-test option that can be taken after the teen studies the areas that need improvement The entire test is designed to take about one hour. Many teens finish in less time.

A score screen advises the teens of their results and displays areas of strength and those where improvement is recommended.

The score screen displays the results for the multiple choice portion and the driving scenarios separately. For each part, the performance in the six domains is evaluated using the data recorded in the database to calculate the score for the appropriate domain. A passing score in a domain is indicated by the domain name being listed as a "strength." A score below passing causes the domain to be listed under "needs improvement" and tips for improvement are provided.

A preferred embodiment of the invention has been described above in Sections I–XI using specific examples with various time limits and ordering of steps forming the invented system and method. However, the invention is not limited to the specific examples and indicated time limits which merely show a specific embodiment, and should not be construed as limited to the specifics of this description, but rather, reference should be made to the following claims for the appropriate limitations of the invention.

What is claimed is:

1. A method for training teenage motor vehicle drivers comprising the steps of:

using prerecorded audio/visual presentations to provide training in areas of lifestyle, hazardous driving risk and safe driving benefit perception, visual search, speed adjustment, vehicle to vehicle speed management and hazard detection;

using computer based training to supplement the audio/video presentation training in the areas of lifestyle, hazardous driving risk and safe driving benefit perception, visual search, speed adjustment, vehicle to vehicle speed management and hazard detection;

providing activities involving the driver and at least one of his or her parents;

using interactive driving simulation with three independent, active mirrors and a windshield view;

developing a database that records all actions and provides for artificial intelligence, said database providing diagnostic assessment of driver skills using unobtrusive psychodiagnostics to assess lateral search, risk perception, speed adjustment, space management, and hazard recognition such that the diagnostic assessment provides for individualized and prescriptive instruction using a certification test feedback score screen to build an understanding of safe and skillful driving behaviors and explain interactive driving.

2. The method defined by claim 1 wherein said using prerecorded audio/visual presentations further comprises the steps of:

building a community of teenage drivers/peers where safe driving is valued and reinforced and which possesses the necessary skills to emulate more experienced drivers;

introducing key facts about teenage drivers by re-examining mistaken views and stereotypes about teenage drivers to illustrate benefits arising from safe driving;

creating an understanding that how we drive is part of defining who we are as people to associate a sense of morality for defining a duty to drive safely;

developing visual search and hazard identification skills;

identifying types of risky behaviors that can be correlated to risky driving; and creating an understanding of lifestyle issues and their impact on driving behaviors to build an understanding of safe and skillful driving behaviors and explain interactive driving.

3. The method defined by claim 1 wherein said using computer based training further comprises the steps of:

developing and practicing an understanding of visual search;

making teenage drivers aware of an practice risk/benefit analysis;

exposing teenage drivers to and practice speed adjustment and space management;

exposing teenage drivers to techniques to use speed and space concepts; and enabling teenage drivers to practice components of a safe driving conceptual model.

4. The method defined by claim 3 wherein using computer based training further comprises steps of:

providing interactive video segments;

enabling the teenage driver to perform exercises; and developing visual search techniques for identifying risk, performing proper speed adjustment and performing proper space management from the interactive video segments and exercises to build an understanding of safe and skillful driving behaviors and explain interactive driving.

5. The method defined by claim 1 wherein said providing activities step further comprises the steps of:

building a sense of parental involvement around safe driving;

getting parents and teenage drivers talking about issues challenging teenage drivers to associate a sense of family with driving safely;

providing practice in identifying hazardous environments and discussing coping strategies;

providing interactive driving practice on key concepts; and practicing advanced driving.

6. The method defined by claim 5 wherein providing activities step includes steps of:

a) providing audio/visual presentations watched and listened to by the teenage driver and at least one of his or her parents; and b) providing on the road driving exercises involving the teenage driver and at least one of his or her parents to build an understanding of safe and skillful driving behaviors and explain interactive driving.

7. The method defined by claim 1 wherein using said prerecorded audio/visual presentations further comprises steps of:

including trigger video segments to form the basis for subsequent discussion by teenage drivers and a facilitator; and hosting a discussion by teenage drivers and a facilitator to build an understanding of safe and skillful driving behaviors and explain interactive driving.

* * * * *